Oct. 23, 1945. H. E. HRUSKA ET AL 2,387,398
HYDRAULIC TRANSMISSION
Filed March 16, 1944 2 Sheets-Sheet 2

ALFRED B. SIBERT INVENTORS.
AND HOWARD E. HRUSKA
BY
Oltsch & Knoblock
Attorneys.

Patented Oct. 23, 1945

2,387,398

UNITED STATES PATENT OFFICE 2,387,398

HYDRAULIC TRANSMISSION

Howard E. Hruska, South Bend, and Alfred B. Sibert, Rising Sun, Ind.

Application March 16, 1944, Serial No. 526,692

8 Claims. (Cl. 60—54)

This invention relates to improvements in hydraulic transmissions, and particularly to transmissions for use in automobiles, buses and trucks.

The primary object of the invention is to provide a hydraulic transmission having coupling and torque multiplication stages with novel means for transmitting driving torque from the driven elements in each stage to the driven shaft.

A further object is to provide a hydraulic transmission having unit ratio and torque multiplying stages provided by two independent driven elements with a common driving connection to a driven shaft, one of said driven elements being adapted for predetermined relative longitudinal and rotative movement relative to the other responsive to the torque requirements of the driven shaft as modified by the speed of rotation of said shaft, for automatically selecting its position in the required operating stage.

A further object is to provide a hydraulic transmission with coupling and torque multiplication stages provided by two independent driven elements having an adjustable connection for transmitting their conjoint output to a driven shaft, said connection being responsive to the torque requirements and speed of the driven shaft to automatically adjust the relative positions of said driven elements for operation in the stage required by the operating conditions of the device.

A further object is to provide a hydraulic transmission with an epicyclic gear train and clutches associated with said gear train for controlling the direction of rotation of an output shaft.

A further object is to provide a device of this character having aligned driven and output shafts with an adjustable driving connection therebetween selectively operable to control the direction of rotation of said output shaft and to brake said driven shaft.

A further object is to provide a hydraulic transmission with a primary driven rotor, a second driven rotor having two sets of vanes, a third rotor having guide vanes associated with one set of vanes of said second rotor, said second and third rotors being shiftable longitudinally in unison, a one-way brake controlling said third rotor, and an adjustable connection between said first and second rotors for transmitting torque to a driven shaft, said connection cooperating with speed responsive means for longitudinally positioning said second and third rotors responsive to the torque requirements and speed of said driven shaft.

Other objects will be apparent from the description and appended claims.

Figure 1:
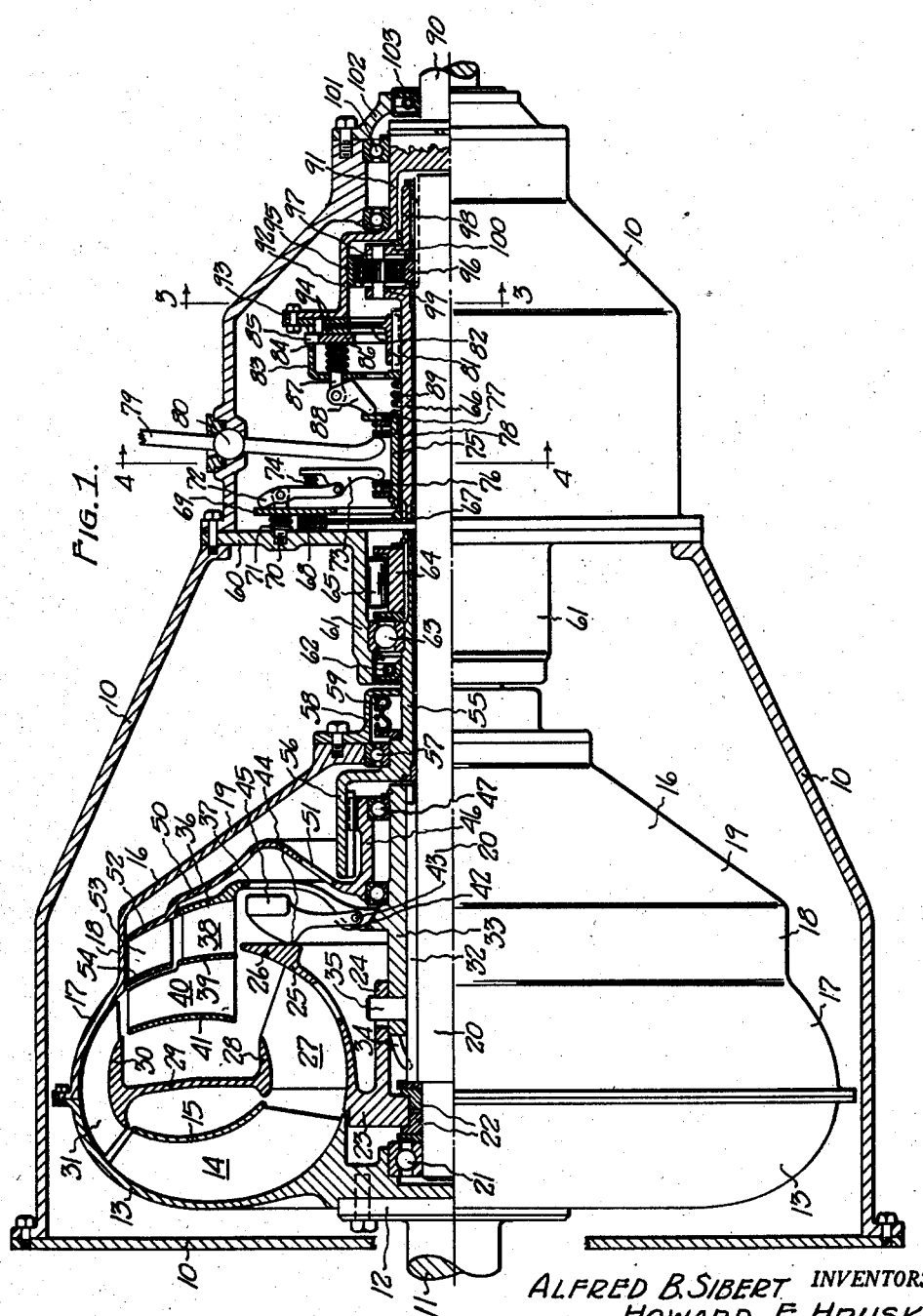
Fig. 1 is a longitudinal sectional view of the device, with parts shown in elevation.

Referring to the drawings, which illustrate the preferred embodiment of the invention the numeral 10 designates a multi-part housing adapted to be connected with the frame of a vehicle in any suitable or conventional manner. A driving shaft 11, such as the crank shaft of an internal combustion engine, extends into the forward end of housing 10. Shaft 11 mounts a disc 12 to which is secured an impeller frame 13 mounting impeller vanes 14 which are connected by an inner concavo-convex annulus 15. Impeller frame 13 defines a portion of the outer wall of a torus, and extends beyond the opposite ends of vanes 14. Frame 13 is secured at its outer margin to a housing portion 16 having an outer concavo-convex portion 17 forming a part of the torus, a rearwardly projecting cylindrical portion 18 and a frusto-conical rear portion 19. The impeller frame 13 and housing portion 16 cooperate to provide a rotatable sealed fluid containing chamber.

A driven shaft 20 is journaled at its front end by bearing 21 within a cup-shaped hub portion of impeller frame 13. A bearing 22 on said shaft journals the hub portion 23 of a primary rotor having a rearwardly projecting sleeve 24 and a curved wall 25 whose inner surface also defines a portion of the torus. The marginal portion 26 of wall 25 preferably has a flat annular outer face for purposes to be set forth hereinafter. Wall 25 mounts a series of vanes 27 projecting outwardly therefrom and encircled by and secured to a rigid annulus having a longitudinally curved inner flange 28, a substantially radial web 29 and a longitudinally curved outer flange 30. Flanges 28 and 30 are so shaped and positioned that they cooperate with wall 15 to define portions of the inner wall of the torus. A plurality of vanes 31 are rigidly secured to and extend outwardly from flange 30, the outer edges of said vanes having a rotative clearance with housing or chamber parts 13 and 16. The forward ends of vanes 27 and 31 extend adjacent to but have free clearance or spacing from the inner and outer edges of vanes 14.

Shaft 20 is splined at 32 rearwardly of bearing 22, and a splined sleeve 33 encircles said splined shaft portion and is longitudinally shiftable thereon. A portion of sleeve 33 fits freely within sleeve 24. Sleeve 24 has a plurality of elongated cam slots 34 therein, and sleeve 33 carries pins 35 each fitting slidably in one of said cam slots. A rotor or configured disc 36 is carried by sleeve 33 centrally thereof, said disc having a plurality of equispaced openings 37 therein. A series of vanes 38 project forwardly from the margin of disc 36 and are rigidly secured at their forward edges to an annulus 39 of slightly concavo-convex curvature. The inner diameter of annulus 39 and of vanes 38 is preferably slightly greater than the large diameter end of wall 25, and the outer diameter thereof is substantially smaller than that of cylindrical chamber wall portion 18. A set of vanes 40 is secured to annulus 39 to extend forwardly therefrom, and an annulus 41 of slightly concavo-convex curvature is secured to the front edges of vanes 40. Vanes 40 and annulus 41 are of larger radial dimensions than vanes 38 and annulus 39, and are adapted to fit freely between annulus flanges 28 and 30.

A lever 42 is pivoted at 43 in each opening 37 of disc 36 about an axis perpendicular to shaft 20, whereby said lever is free to swing in a longitudinal direction. A projection 44 is formed at the front edge of each lever, said projection being adapted to bear against the outer surface of portion 26 of the primary rotor. A weight 45 is carried by the rear outer end of each lever.

Figure 2:
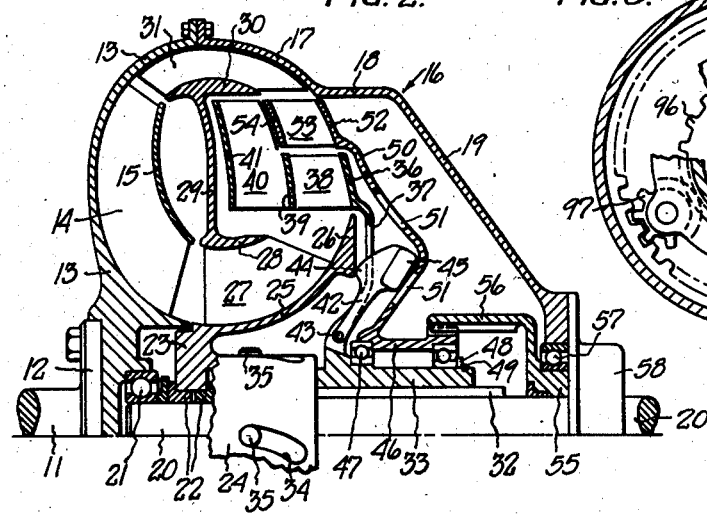
Fig. 2 is a fragmentary longitudinal sectional view similar to Fig. 1 and showing a different operating position of the device.
Figure 3:
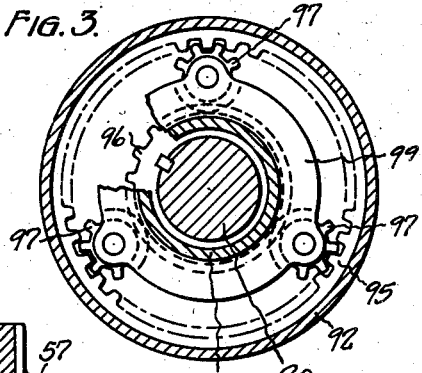
Fig. 3 is a transverse sectional view taken on line 3—3 of Fig. 1.

A sleeve 46 freely encircles sleeve 33 and is journaled thereon by bearings 47, the outer bearing being positioned on sleeve 33 by a ring 48 and a snap ring 49 seating in a groove in sleeve 33. A configured disc 50 is carried by the front end of sleeve 46, and has openings 51 therein. Disc 50 terminates in a marginal portion 52 of slightly concavo-convex curvature substantially aligned with the outer margin of disc 37 and interposed between the same and cylindrical chamber wall 18. A set of vanes 53 is secured to and projects forwardly from marginal disc portion 52, and an annulus 54 of slightly concavo-convex curvature is secured to the front edges of vanes 53. Annulus 54 has free rotative clearance with vanes 40 and annulus 39, and vanes 53 have free rotative clearance with vanes 31 and annulus 38. The configuration of disc 50 is such as to receive the levers 42 when positioned as shown in Fig. 2 to accommodate positioning of vanes 38 and 53 in the torus.

A sleeve 55 encircles shaft 20 rearwardly of sleeve 46 and is freely rotatable thereon. Sleeve 55 carries an enlarged cylindrical portion 56 at its front end which fits around sleeve 46. Sleeve 46 is splined in cylinder 56 for free longitudinal but non-rotative movement of sleeve 46 relative to cylinder 56. A bearing 57 journals the rear end of fluid chamber or housing part 16 on sleeve 55. A cup-shaped member 58 is secured to the rear end of housing part 16 and encloses a suitable liquid seal 59 engaging sleeve 55.

An annular partition 60 is provided in housing 10 intermediate the ends thereof, and carries a forwardly extending cylindrical portion 61 which terminates adjacent cup-shaped member 58. A liquid seal 62 is mounted within cylinder 61 at its forward end, and a bearing 63 in said cylinder serves to journal sleeve 55 and shaft 20. A one-way brake is positioned in the rear portion of cylinder 61 and includes an inner ring 64 of requisite shape keyed to sleeve 55 and a plurality of rollers 65 retained in the raceway provided by said ring 64 and cylinder 61.

A sleeve 66 encircles and is free to rotate about shaft 20, said sleeve being positioned rearwardly of sleeve 55. A disc 67 is keyed to the forward end of sleeve 66 and carries brake facings 68 at its margin. An annular brake-plate 69 is positioned concentrically of clutch facings 68 at the rear thereof by means of studs 70. A coil spring 71 encircles each stud 70 to normally urge brake plate 69 rearwardly to brake releasing position. A lever 72 is pivoted intermediate its ends to the rear end of stud 70. A bellcrank lever 73 is pivoted to the lower end of lever 72, and a coil spring 74 is interposed between the lower portion of lever 72 and the upper portion of lever 73.

A sleeve 75 rotatably encircles and is longitudinally slidable on sleeve 66. At the forward end of sleeve 75 is mounted a bearing 76 against the inner race of which the lower end of lever 73 bears. A flange 77 is formed at the rear end of sleeve 75. A bearing 78 is mounted on the rear end of sleeve 75, and the lower end of an operating lever 79, pivoted at 80 in the housing 10, is adapted to bear against the front race of bearing 78 as illustrated in Fig. 1. Sleeve 75 is urged forwardly by a coil spring 89.

Sleeve 66 has splined thereto adjacent its rear end the hub 81 of a clutch disc 82 for longitudinal nonrotative movement of the latter thereon. A cup-shaped member 83 fits around the clutch disc and is longitudinally slotted at 84 to receive the ears 85 projecting radially from a clutch plate 86. Clutch plate 86 carries a plurality of longitudinal studs 87 around which fit coil springs bearing against member 83 and clutch plate 86 to normally urge the latter rearwardly in clutch engaging position. A dog or cam 88 is pivoted to the front end of each stud 87, said dog being positioned between and bearing against flange 77 of sleeve 75 and against the front face of cup-shaped member 83. Coil spring 89 is interposed between sleeve 75 and cup-shaped member 83.

The output shaft 90 to be driven by the hydraulic transmission is fixedly connected to a stepped cylindrical member having a small diameter cylindrical portion 91 and a large diameter cylindrical portion 92 from whose forward end projects an annular flange 93 fixedly secured to the rear open end of cup-shaped member 83. Flange 93 provides a clutch plate adapted to be engaged by a clutch facing 94 on clutch disc 82. An internally toothed ring gear 95 is fixedly secured within cylinder 82. An externally toothed sun gear 96 is keyed on shaft 20. A plurality of planet gears 97 are arranged in equi-spaced meshing engagement between gears 95 and 96. A sleeve 98 is journaled on shaft 20 rearwardly of gear 96 and with cylinder 61. A flange 99 is formed on the rear end of sleeve 66 and a flange 100 is formed on the front end of sleeve 98, and these flanges form a cage in which planet gears 97 are journaled.

The rear end of housing 10 has journaled therein cylindrical portion 91 of the output shaft 90 by bearings 101, and a retainer ring 102 is carried thereby and mounts an oil seal 103 encircling shaft 90.

The unit ratio or coupling stage of the device is illustrated in Fig. 1. In this stage the vanes 40 of the secondary rotor are positioned in the torus whose inner walls are defined by annulus 16 of the impeller, flanges 28 and 30 of the primary rotor, and annulus 41 of the secondary rotor. The outer wall of the torus is defined by impeller wall 13, housing portion 17, wall 25 of the primary rotor, annulus 39 of the secondary rotor, and annulus 54 carried by vanes 53. The impeller vanes generate liquid flow around the torus, which is discharged against vanes 31 of the primary rotor and then acts upon vanes 40 of the secondary rotor and returns to the impeller past the hub vanes 27 of the primary rotor. Each of the primary and secondary rotors is thus subjected to driving action. Rotation imparted to vanes 40 is transmitted directly through disc 36 and sleeve 33 to driven shaft 20. Rotation imparted to the vanes 31 and 27 of the primary rotor is transmitted by sleeve 24 to pins 35, sleeve 33 and the shaft 20. Hence both rotors transmit rotation to shaft 20 through sleeve 33.

If the torque requirements of the shaft 20 should increase substantially and the speed of rotation thereof should decrease simultaneously, or if a vehicle is being started from a standing position, the cam load between cam slots 34 and pins 35 increases until it reaches an amount sufficient to cause pins 35 to move forwardly in the cam slots. This pin movement shifts sleeves 33 and 46 forwardly to position vanes 38 and 53 in the torus as illustrated in Fig. 2. Vanes 53 are arranged to guide the liquid flow therethrough in a direction to apply maximum forward torque to inner vanes 38, and therefore vanes 53 sustain a reverse rotational stress. This stress is transmitted through sleeve 46, cylinder 56 and sleeve 55 to one-way brake 61, 65, 66 which locks sleeve 46, disc 50 and vanes 53 against reverse rotation and constitutes vanes 53 stator vanes. In this way the operating stage of the device illustrated in Fig. 2 provides two sets 31 and 39 of rotor vanes, and an interposed set 53 of stator vanes, vanes 38 and 53 being shaped to provide a torque multiplying fluid reaction on the secondary rotor.

It will be noted that this automatic adjustment of the secondary rotor from coupling stage to torque converting stage has not been opposed substantially by levers 42 in starting, because there has been no centrifugal force applied to and through said levers from their weights 45. However, in cases where the driven shaft is subjected to an increase in torque while moving, as when climbing a hill, the levers 42 resist shifting of the secondary rotor to torque multiplying position until the torque load bears such a relation to speed that torque multiplying action is advisable for efficiency. The device can be made to respond to any predetermined relation by proper correlation of the parts. Also, the same adjustment to torque multiplying operation is obtained when the engine is suddenly accelerated greatly while the vehicle is moving at low speed. In other words, levers 42 serve to restrain shifting of the device to the torque multiplying position upon increase in the output torque requirements until the speed of the driven shaft and the conditions of operation are such that operation in torque multiplying adjustment is efficient, as distinguished from shifting responsive to speed only or to torque load only. The levers 42 also serve the additional function of imparting, through application of centrifugal force thereto, a rearward push upon the shiftable secondary rotor to move it to the coupling stage when the driven shaft reaches a predetermined speed relative to the torque requirements thereof, i. e., overcomes the torque transfer cam action of slots 34 and pins 35 when a given shaft speed is reached.

The direction in which the output shaft 90 is driven by the device is controlled by the position of the operator 79 which may be operated manually or by any suitable multi-position power member. The forward drive position of the parts is illustrated in Fig. 1, and entails engagement of clutch 86, 94 and disengagement of brake 68, 69. Thus gear 96 which is keyed to shaft 20 rotates therewith, and gear 95 is also rotated with and in the same direction as shaft 20 by virtue of the engagement of clutch 86, 94 which interlocks the cylinder 92 mounting gear 95 with the sleeve 66 carrying the cage of planet gears 97.

Figure 6:
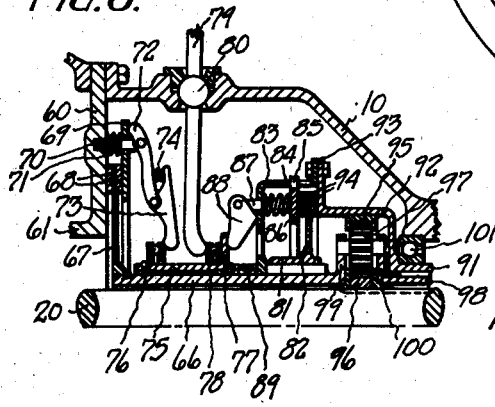
Fig. 6 is a fragmentary longitudinal sectional view illustrating the controlling clutches in reversing position.

The reverse driving position is illustrated in Fig. 6, wherein operator 79 is positioned to urge sleeve 75 rearwardly against spring 89, thereby rocking the dogs 88 to pull forwardly on clutch plate 86 and disengage clutch 86, 93, 94, while at the same time shifting levers 73 and 72 to urge brake plate 69 forwardly to engage brake 68, 69, 60. Since the fixed housing member 60 forms one of the elements of the brake thus engaged, and since brake disc 67 is splined on sleeve 66 whose flange 99 forms a part of the cage for the planet gears 97, sleeve 66 and the planet gear cage will remain stationary while shaft 20 and gear 96 rotates. The planet gears 97 will therefore be caused to rotate in a direction opposite that in which gear 96 rotates, and they will cause ring gear 95, cylinder 92 and output shaft 90 to rotate in a direction opposite the rotation of shaft 20, i. e., reversely from the direction in which said parts rotate when positioned as illustrated in Fig. 1.

Figure 5:
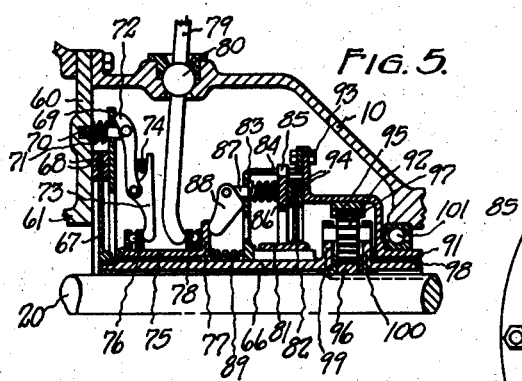
Fig. 5 is a fragmentary longitudinal sectional view illustrating the controlling clutches in neutral or rotor-braking position.
Figure 4:
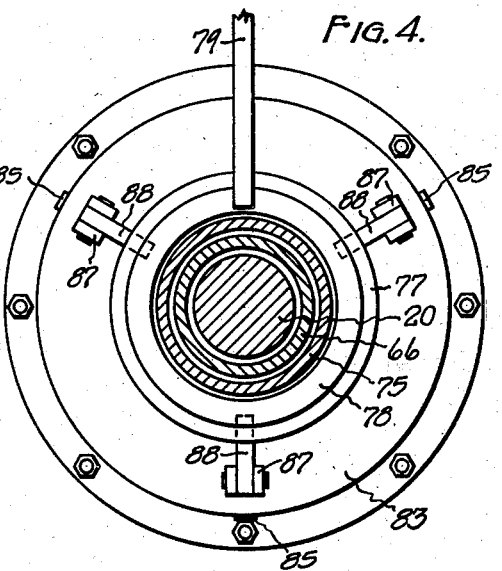
Fig. 4 is a transverse sectional view taken on line 4—4 of Fig. 1.

The parts are so arranged that when operator 79 is in a predetermined position intermediate the positions shown in Figs. 1 and 6, both the clutch and brake will be engaged simultaneously. This position is illustrated in Fig. 5, and constitutes the neutral or idling position. The engagement of brake 68, 69, 60 locks the sleeve 66 stationary. The engagement of clutch 86, 93, 94 locks cylinder 92 and ring gear 95 in fixed relation to sleeve 66 by virtue of the splined connection of the hub 81 of clutch disc 82 with said sleeve. Therefore, both the gear 95 and the cage for the planet gears 97 are locked against movement, and this serves to lock gear 96 and shaft 20 against movement by the transmission rotors. It will be understood that the parts will only be so locked against rotation when the transmission is operating at idling speed, i. e., when the torque developed by the transmission is at a minimum.

Two important results are achieved by this neutral arrangement. The first is that creeping of the vehicle, such as is commonly experienced with fluid driven vehicles at idling position, is avoided without requiring application of wheel brakes. Nevertheless, if a quick start is desired, the operator 79 may be retained in its Fig. 1 position while the engine idles, and the vehicle may then be held against creeping by the wheel brakes in the same manner as with conventional fluid drives. The second advantage of the neutral position is of greater value and importance and also follows from the fact that driven shaft 20 is held stationary. A free running rotor, even though operating very slowly and transmitting very little torque at idling speed, is similar to a flywheel with respect to its inertia. Thus when a clutch engages the same a jerky action results, first from the initial action of shearing the free flow of liquid, and then from the subsequent surge or working flow of the liquid in the torus. Consequently, conventional devices include metering and cushioning devices to absorb the rotor inertia and smooth the starting operation. No such jerking action occurs in this device since the clutch is engaged when the vehicle is stopped or stopping, and upon starting of the vehicle one clutch is released to permit the rotor to operate with a smooth action, i. e., a release of the rotor for response to liquid flow in the torus. Hence the instant device eliminates the necessity for the metering and cushioning devices mentioned above.

We claim:

1. A hydraulic transmission comprising an impeller and a pair of vaned rotors cooperating to define a torus, one of said rotors having a sleeve splined on a driven shaft for longitudinal movement thereon and two sets of vanes selectively positioned in said torus, the other rotor having a sleeve rotatably encircling said first sleeve and provided with an elongated cam slot therein, a pin carried by said first sleeve and shiftably seating in said cam slot to normally urge said splined rotor in one direction, and speed responsive means urging said splined rotor in the opposite direction.

2. A hydraulic transmission comprising an impeller and a pair of vaned rotors arranged to define a torus, a driven shaft, one of said rotors having two sets of vanes selectively positionable in said torus and being splined on said shaft for longitudinal movement, means for transmitting driving torque from the other rotor to said splined rotor and normally urging said splined rotor toward one longitudinal position in response to the torque requirements of said shaft, and means responsive to the speed of said shaft for shifting said splined rotor toward its opposite longitudinal position.

3. A hydraulic transmission comprising an impeller and a pair of driven rotors cooperating to define a torus, a driven shaft, one of said rotors being splined and longitudinally shiftable on said shaft between two operative positions and having two sets of vanes each interposed in said torus in one of said operative positions, a shiftable drive connection between said rotors responsive to the torque requirements of said shaft for urging said shiftable rotor to one position, and centrifugal means for urging said shiftable rotor to the other position.

4. A hydraulic transmission comprising driving and driven shafts, an impeller carried by said driving shaft, a pair of vaned rotors cooperating with said impeller to define a torus, one rotor being journaled on said driven shaft and the other having a slidable driving connection with said shaft and a plurality of sets of vanes, interfitting members carried by said rotors, a pin and elongated cam slot driving connection between said interfitting members, and centrifugal means for urging said slidable rotor to one operative position relative to said torus.

5. A hydraulic transmission comprising an impeller, a rotor juxtaposed to said impeller, a driven shaft, a second rotor splined on said shaft and longitudinally shiftable thereon, said second rotor having two sets of vanes selectively positionable in registration with said first rotor, said impeller and rotors defining a torus, an adjustable driving connection between said rotors and responsive to the torque requirements of said shaft for shifting said second rotor to one position, speed responsive means for shifting said rotor to a second position, a member journaled on and shiftable with said second rotor and carrying a set of vanes registering with one set of vanes on said second rotor, and a one-way clutch for holding said member against rotation in one direction.

6. A hydraulic transmission comprising an impeller, a vaned primary rotor journaled on a driven shaft and juxtaposed to said impeller to define the major portion of a torus, a unit shiftable on said shaft and including a rotor having two stages of vanes and a driving connection with said shaft and a runner journaled on said last named rotor and having a set of guide vanes registering with the vanes in one stage of said rotor, means responsive to shaft speed for urging said unit to a position with one vane stage in said torus, a shiftable driving connection between said rotors for urging said unit to a position with said registering rotor and runner vanes in said torus, and means for holding said runner against rotation counter to said shaft.

7. A hydraulic transmission comprising an impeller, a vaned rotor journaled on a driven shaft, a second rotor having a slidable driving connection with said shaft, a runner journaled on said second rotor, said second rotor having primary and secondary sets of vanes and said runner having a set of vanes juxtaposed to said secondary vanes, a one-way clutch controlling said runner, centrifugally operated means for positioning said second rotor with its primary vanes in fluid reactive relation during normal operation of said transmission, interfitting parts carried by said rotors, and a pin and cam slot driving connection between said rotors responsive to the torque requirements of said shaft at low speed for positioning said second rotor and runner with the registering vanes thereof in fluid reactive relation.

8. A hydraulic transmission having a toroidal liquid flow path, comprising an impeller forming part of said path, a primary rotor journaled on a driven shaft and defining the central portion of said path, a secondary rotor completing said path and having a shiftable driving connection with said shaft, said secondary rotor having coupling and converter sets of vanes, a runner journaled on and shiftable with said secondary rotor and having a set of guide vanes encircling said converter vanes, means controlling the rotation of said runner including a one-way clutch, speed responsive means carried by said secondary rotor and acting against said primary rotor for shifting said secondary rotor to position said coupling vanes in said path, and a shiftable torque transmitting connection between said rotors and operable at low speeds for shifting said secondary rotor to position said converter vanes and runner vanes in said path.

HOWARD E. HRUSKA.
ALFRED B. SIBERT.